TELEVISION APPARATUS FOR WEAK SIGNAL TUNING
Filed April 9, 1958 3 Sheets-Sheet 1
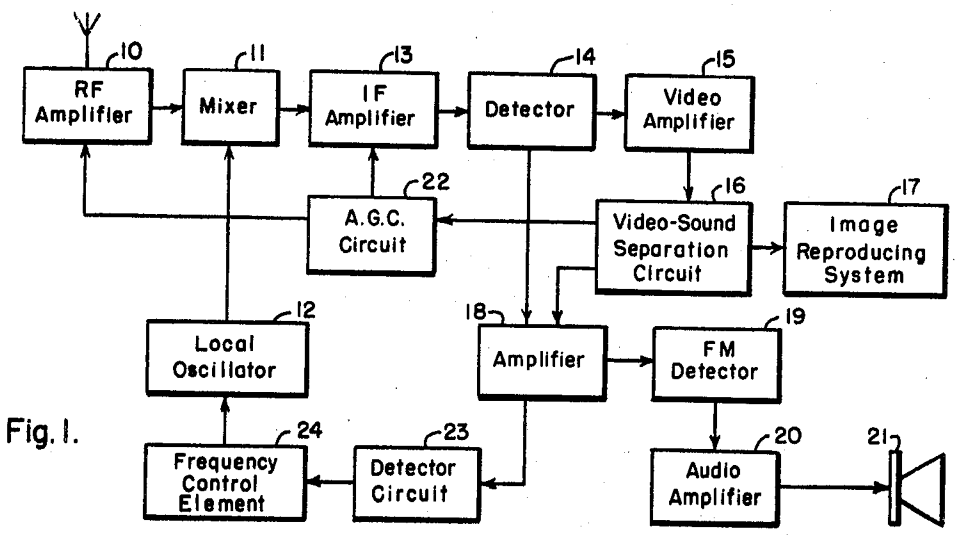
Fig. I.
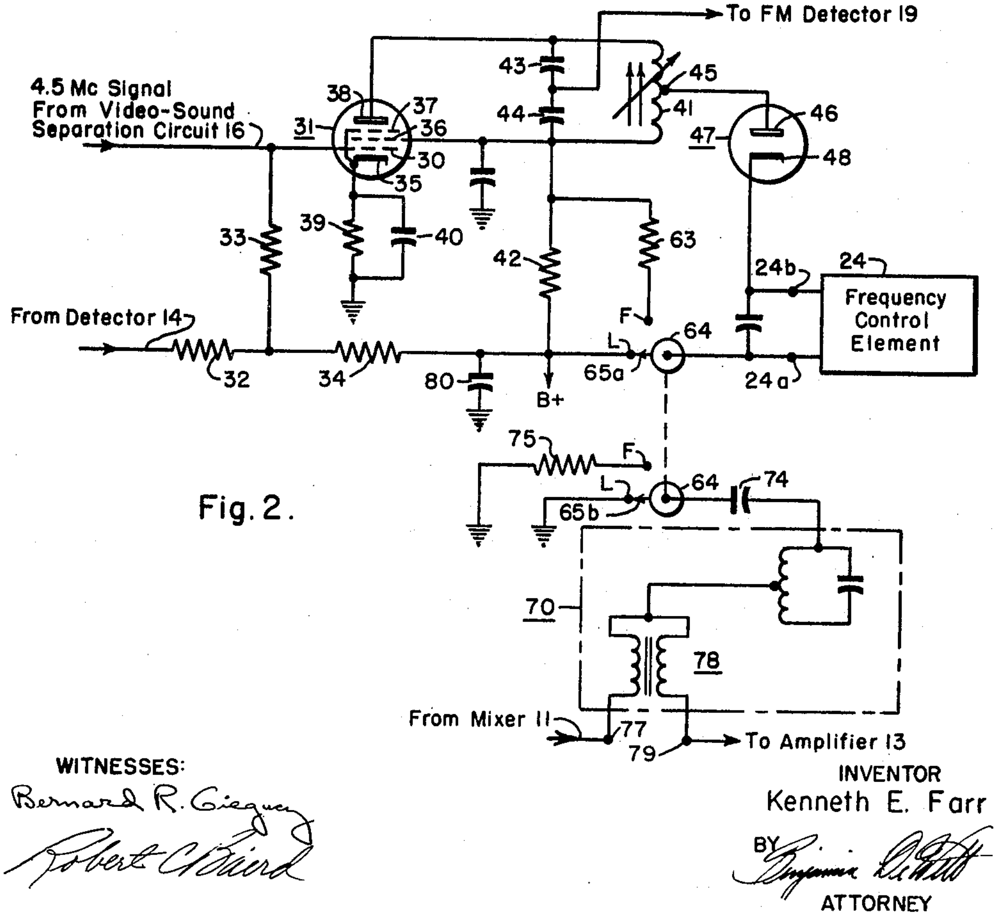
Fig. 2.
WITNESSES:
Bernard R. Giegue
Robert C. Baird
INVENTOR
Kenneth E. Farr
BY Benjamin DeWitt
ATTORNEY March 28, 1961 K. E. FARR 2,977,409

TELEVISION APPARATUS FOR WEAK SIGNAL TUNING

Filed April 9, 1958 3 Sheets-Sheet 3

United States Patent Office 2,977,409

Patented Mar. 28, 1961

2,977,409

TELEVISION APPARATUS FOR WEAK SIGNAL TUNING

Kenneth E. Farr, Rockefeller Township, Northumberland County, Pa., assignor to Westinghouse Electric Corporation, East Pittsburgh, Pa., a corporation of Pennsylvania Filed Apr. 9, 1958, Ser. No. 727,315

6 Claims. (Cl. 178—5.8)

This invention relates generally to television receivers and, more particularly, to automatic frequency control circuits for them.

In standard television systems, it is the practice to transmit the picture signals on one carrier wave and to transmit complementary sound signals on an adjacent carrier wave.

In television receivers of the type utilizing the intercarrier sound system, a frequency modulated sound signal carrier is derived by heterodyning the picture and sound intermediate frequency signals. The intercarrier sound frequency corresponds to the difference between the picture and sound carrier frequencies and in standard television systems is 4.5 megacycles.

It has been the practice in the design of a television receiver of the intercarrier sound type to employ some sort of attenuation circuit or trap to control the sound carrier level relative to the picture carrier level. The attenuation circuits, although helping to shape the overall picture intermediate frequency response curve, are provided primarily to prevent beats in the second detector between the sound carrier and high frequency video components. In a single second detector type of color television receiver, an even greater attenuation is usually required at the accompanying sound carrier frequency to prevent beats between the high frequency color components and the sound carrier.

It is highly desirable that the frequency of the local oscillator in both monochrome and color television receivers be controlled in order to control the frequency of the intermediate sound signal to effect adequate rejection of the accompanying sound carrier by the attenuation circuit.

In the copending application Serial No. 722,735, filed March 20, 1958, entitled "Television Apparatus" by Charles W. Baugh, Jr., there is described an automatic frequency control system for an intercarrier type television receiver by means of which the frequency of the local oscillator is controlled. In accordance with the principles set forth in said copending application, use is made of the intercarrier sound signal and the direct current component developed at the second detector to effect control of the frequency of the local oscillator. In particular, in said copending application, use is made of a first control signal which is a function of the level or amplitude of the intercarrier sound signal and a second control signal which is a function of the direct current component or average direct current voltage developed at the second detector to effect control of the frequency of the local oscillator.

Automatic frequency control systems of the type described in the aforementioned copending application are intended to eliminate the need of a manual fine tuning control means, thereby reducing construction costs and at the same time providing continuous optimum tuning without the annoyance of periodic manual adjustment to compensate for oscillator drift.

One factor which has heretofore limited the commercial use of automatic frequency control systems was the necessity of providing for abnormal tuning when operating under unfavorable conditions such as reception of weak, fringe-area signals. In reception of fringe-area stations, the average viewer will compensate by turning the local oscillator to move the picture IF carrier further into the passband, thereby improving the video signal to noise ratio. In so doing the sound carrier is shifted further out of the passband and the decreased sound signal must be improved by readjusting the volume control.

Heretofore, it has been necessary to provide a manual fine tuning control for fringe-area signal reception even though the AFC circuit is adequate for normal strength signals. If such a manual control must be provided for fringe reception, the advantages of the AFC circuits are partially nullified. As a result, the expense of AFC circuits has not been generally warranted and AFC heretofore did not achieve wide commercial acceptance.

The present invention provides an AFC system for television receivers which normally controls the frequency of the local oscillator to maintain optimum tuning for reception of strong signals from local stations. Further, the invention includes means for automatically enhancing the video signal to noise ratio when it is desired to receive weak or fringe-area signals.

Accordingly, among the objects of the present invention are the following:

To provide an improved automatic frequency control system for television receivers.

To provide a television receiver of the intercarrier type in which the frequency of the IF video carrier signal is stabilized near a first fixed frequency for reception of strong signals and is automatically stabilized near a second fixed frequency when it is desired to receive weak signals.

To provide an improved television receiver in which the frequency of the heterodyne oscillator is stabilized at a first frequency interval from the received radio frequency signal when the receiver is tuned to receive a strong signal and is stabilized at a different frequency interval from the received signal when the receiver is tuned to receive a weak or fringe-area signal.

To provide a generally improved television receiver having simplified manual controls.

To provide an automatic frequency control circuit for an intercarrier type television receiver providing wide pull-in range for the local oscillator of the receiver.

These and other objects of this invention will be apparent from the following description taken in accordance with the accompanying drawing, throughout which like reference characters indicate like parts, and in which:

Figure 1 is a block diagram of the television receiver including an automatic frequency control circuit in accordance with the invention;

Fig. 2 is a circuit diagram in schematic form of an automatic frequency control circuit in accordance with the invention;

Figures 3, 4A:
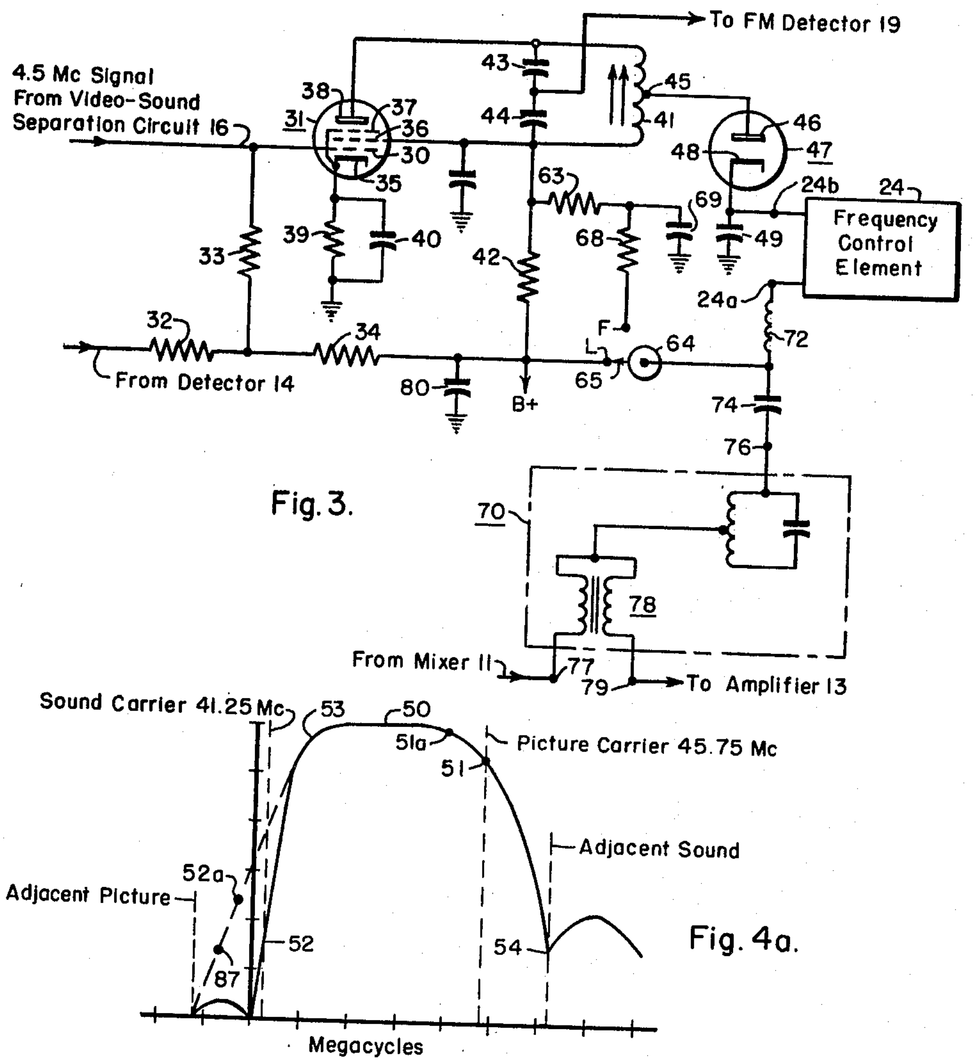
Fig. 3 is a schematic diagram of a different embodiment in accordance with the invention.
Figs. 4*a* through 4*e* show a plurality of curves used in explaining the operation of the invention.

The television receiver illustrated in Fig. 1 includes a radio frequency amplifier 10 which supplies both the sound and picture radio frequency carriers to a mixer 11. In accordance with present-day standards, these carriers are separated by 4.5 megacycles. The output of a tunable local oscillator 12 is supplied to the mixer or first detector 11 and the beat frequencies provided by the heterodyning action within the mixer 11 includes the picture intermediate frequency carrier and sound intermediate frequency carrier. The picture and sound intermediate frequencies are applied to a common intermediate frequency amplifier 13, wherein signals within a predetermined frequency range defined by the passband of the amplifier 13 are amplified. The intermediate frequency amplifier 13 preferably has a frequency response characteristic substantially as shown in Fig. 4*a*. The level of the intercarrier sound signal which is produced in the second detector 14 of the receiver is a function of the position of the sound modulated intermediate frequency carrier signal with respect to the desired frequency response characteristic. The amplitude of the sound intercarrier signal will change whenever the intermediate frequency video and sound signals depart from predetermined normal positions with respect to the response characteristic of the intermediate frequancy amplifier.

The picture and sound intermediate frequencies from the intermediate frequency amplifier 13 are applied to a second detector 14 wherein the picture signals are derived from the picture carrier IF signal and the picture and sound carrier signals are heterodyned to produce an intercarrier signal which is frequency modulated with sound information. The video or picture wave and the intercarrier sound wave are applied to video amplifier 15. After amplification in the video amplifier 15, the video and intercarrier sound signals are applied to a video-sound separation circuit 16 which separates the video and intercarrier sound signals. The video signals are applied to a suitable image reproducing system 17.

The intercarrier sound signal from separation circuit 16 is applied to an amplifier 18 in the sound channel of the receiver. The sound channel may further comprise a frequency modulation detector 19 and an audio amplifier 20. The output of the audio amplifier 20 is connected to a suitable sound-reproducing device 21.

The video output from the video-sound separation circuit 16 is also applied to an automatic gain control circuit 22 of the "peak detection type" which acts in a well-known manner to control the amplification of the stages comprising the radio frequency amplifier 10 and the intermediate amplifier 13 in accordance with the intensities of received television signals.

A detector or rectifier circuit 23 which may be included as a part of the frequency modulation detector 19 is connected to the amplifier 18 and to a frequency control element 24. The output of the detector circuit 23 is applied to the frequency control element 24 which, in turn, controls the frequency of the local oscillator 12. The frequency control element 24 may comprise a diode which, in series with a capacitor, is connected across the tank circuit of the local oscillator 12, shunting a variable reactance across the tank circuit and hence comprising means for changing the frequency of the local oscillator. Variation of reactance is accomplished by varying the effective load applied to the diode to control its conduction. The amount of reactance applied across the tank circuit of the local oscillator 12 is determined by the loading applied to the frequency control element 24. This loading is governed by the developed voltage of the circuit comprising the amplifier 18 and the detector circuit 23. As the reactance across the tank circuit of the local oscillator 12 is varied, the oscillator frequency is varied. If the capacitive reactance is increased, the frequency of the oscillator 12 will be increased and vice versa. It is to be understood, of course, that the control element 24 alternatively may comprise any one of various known control devices having a reactance which varies as a function of an applied control potential.

In accordance with the present invention, a signal which is a function of the direct current component developed at the second detector 14 is supplied to the amplifier 18. In Fig. 2 there is shown a schematic representation of the circuit comprising the amplifier 18 and the detector circuit 23 of Fig. 1.

Referring to Fig. 2 in detail, the intercarrier sound signal from the video-sound separation circuit 16 is coupled to the control grid 30 of an electron discharge device 31. The direct current voltage developed at second detector 14 is also coupled through resistors 32 and 33 to the control grid 30 of the device 31. From the junctions of resistors 32 and 33 a connection is made through a resistor 34 to a source of positive potential represented as B+. It is to be understood that the negative terminal of potential source B+ is connected to a point of reference potential or ground in accordance with conventional practice.

Electron discharge device 31 is provided with a cathode 35, a screen grid 36, a suppressor electrode 37 and a plate 38. The cathode 35 is connected to ground potential through a resistor 39 shunted by a capacitor 40. The suppressor electrode 37 is connected to the cathode 35. The plate 38 is connected through an inductor 41 having adjustable core and a voltage dropping resistor 42 to the source of operating potential B+. A pair of capacitors 43 and 44 are connected across the inductor 41, and from a point between them a connection is made to the frequency modulation detector 19. From a tap 45 on the inductor 41 a connection is made to the plate 46 of a diode 47.

A first terminal **24*a* of a frequency control device 24 is connected through a switch 65 to the source of operating potential B+. A second terminal 24*b* of the frequency control device 24 is connected to the cathode or emitter electrode 48 of the diode 47, and a filter capacitor 49 is shunted across the terminals 24*a*—24*b* to prohibit alternating current components from entering the control device 24**.

The switch means 65 may conveniently comprise a double pole double throw switch device of conventional design having a first pole **65*a* commonly connected to terminal 24*a* and having a second pole 65*b* mechanically ganged with the first pole. The normally closed contact L of switch 65*a* is connected to the source of potential B+. The normally open contact designated F is connected through a resistor 63 to the upper end of dropping resistor 42**.

Thus, switch means **65*a* is operative to change the bias voltage at terminal 24*a* from B+ voltage to a lower voltage corresponding to that of screen grid 36**.

The second pole **65*b* of switch means 65 is electrically associated with the intermediate frequency signal path of the receiver and provides means for changing the amount by which the IF channel attenuates the intermediate frequency sound carrier signal. To this end, a three terminal wave trap or attenuation circuit 70 is provided in the IF channel with its input terminal being coupled to the output of mixer 11, its output terminal coupled to the input circuit of amplifier 13 and with its third terminal connected to the common terminal of switch 65*b*. The normally closed contact L of switch 65*b* is connected to ground and contact F is connected through a resistor 75 to ground. While the attenuation circuit 70 preferably comprises a bifilar-T type of sound trap having a pair of tightly coupled windings 78 as shown in Fig. 2, however, it is to be understood that the attenuation circuit 70 may comprise any one of various known attenuation circuits or traps such as those described in Fink, "Television Engineering," second edition, chapter 7, sec. 139. The essential criteria for the sound trap 70 and its associated circuitry are (1) that the trap shall provide discrimination in the IF channel to attenuate the sound IF carrier sufficiently to substantially eliminate associated-sound interference in the picture; and (2) that switch means 65*b* shall be connected in circuit with the trap 70 so as to be operative when switched to the F position to disable the trap 70**, thereby providing greater amplification of the associated sound IF carrier.

To achieve the first requirement above, the sound trap 70 should be tuned so that, with switch **65*b* in the normal or L position, the sound IF signal output at the second detector 14 is at least about 40 decibels below the maximum response of the IF channel. To achieve the second foregoing criterium the IF amplifier should be aligned so that with the sound trap 70 removed or disabled, the sound IF carrier output to detector 14** is down not more than about 30 decibels when the sound IF carrier frequency is between 40.25 and 41.25 megacycles.

In the particular circuit arrangement of Fig. 2, disabling of sound trap 70 is accomplished by connecting resistor 75 serially between the third terminal of trap 70 and ground through contact F of switch **65*b***.

Fig. 3 shows an alternative fringe switching circuit included in the automatic frequency control system. The circuit of Fig. 3 has the same purposes and achieves the same essential results as heretofore described in connection with Fig. 2, the primary difference being that in the arrangement of Fig. 3 a single pole switch 65 is operative to disable the sound trap 70 and simultaneously change the bias voltage applied to terminal **24*a* of the frequency control element. To those ends a radio frequency choke 72 is connected from terminal 24*a* to switch 65, and a bypass capacitor 74 is connected between the third terminal 76 of the bifilar-T sound trap 70 and the pole of switch 65. Capacitor 74 provides a low impedance path to ground for the intermediate frequency signals appearing in the sound trap 70, which path includes capacitor 74, switch 65 and a bypass capacitor 80. Capacitor 74 further operates to block the direct current voltage at terminal 24*a* from appearing in the trap 70 and the IF channel circuits. Choke 72 provides a high impedance to radio frequencies so that the sound IF signal from trap 70 cannot appear at terminal 24*a***.

In order to provide disabling of the trap 70 when switch 65 is in the fringe reception position, a resistor 68 is connected serially with resistor 63 between the upper end of resistor 42 and contact F of switch 65. A bypass capacitor 69 is connected between ground and the junction of resistors 63 and 68. With switch 65 in the fringe reception position, the path to ground for IF carrier signals is through capacitor 74, switch 65, resistor 68 and capacitor 69. Resistor 68 serves the same function in Fig. 3 as does resistor 75 in the circuit of Fig. 2.

As shown in Fig. 4*a*, the intermediate frequency amplifier 13 has a frequency response characteristic indicated by curve 50. On curve 50, point 51 represents the location of the video IF carrier approximately six decibels below the maximum IF response, and point 52 defines the preferred location of the sound IF carrier. When so located and with trap 70 operating, the sound IF carrier is attenuated at least about 40 decibels below the maximum IF response level.

At least about thirty to fifty decibels difference in amplification of the sound IF carrier relative to amplification of the picture IF carrier is desirable to prevent sound signal components from appearing in the demodulated video frequency output of detector 14. Also, the large amplitude difference between the sound IF carrier and the picture IF carrier at detector 14 enables production of a 4.5 megacycle sound intercarrier signal having a constant amplitude independent of amplitude modulation of the picture carrier. The foregoing is in accord with the known principle that the amplitude of a beat frequency from a linear detector is determined by the amplitude of the smaller heterodyning signal and is independent of the amplitude of the larger heterodyning signal (provided that the two signals are substantially different in amplitude).

In Fig. 4*a*, curve **52*a* defines the response of the IF channel to the sound IF carrier signals when the "local-fringe" switch is in the fringe position. Thus, curve 52*a* is the IF channel response characteristics when sound trap 70** is disabled or removed from the circuits of Fig. 2 or 3.

Figure 4B:
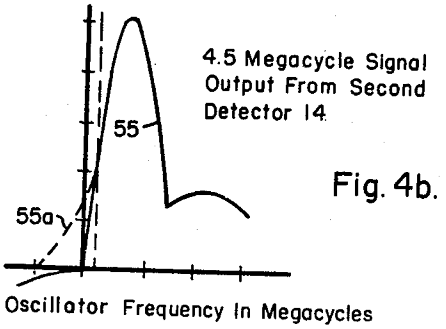
Figure 4C:
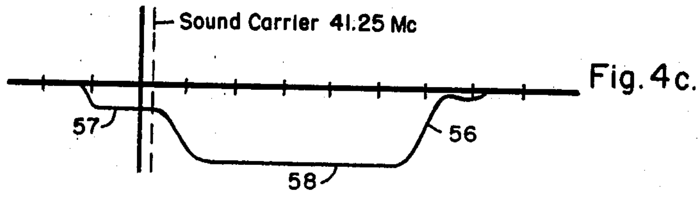
Figure 4D:
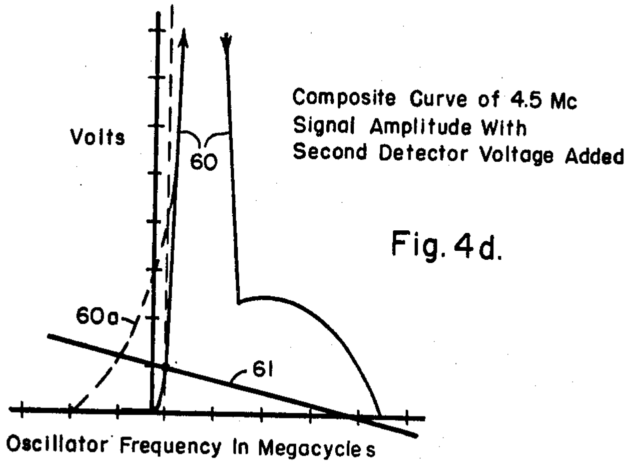
Figure 4E:
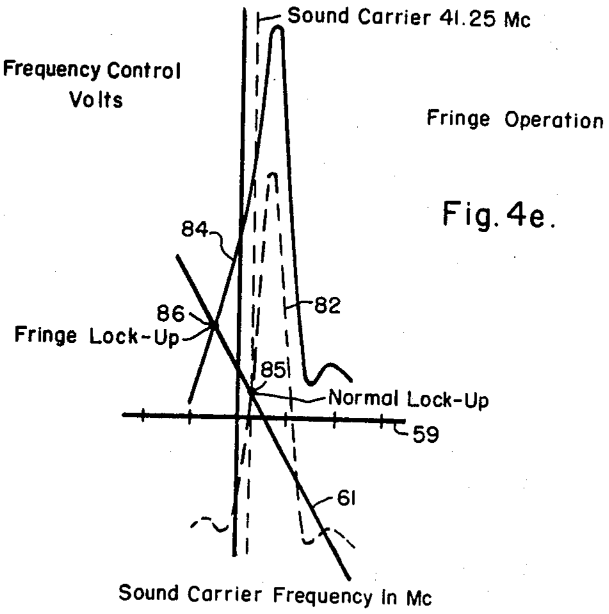

In Fig. 4*b*, curve 55 represents the control signal produced by rectification of the intercarrier sound signal in the detector circuit 23. The amplitude of this control signal varies in accordance with the amplitude of the intercarrier sound signal. In Fig. 4*c*, curve 56 represents the average direct current component at the output of second detector 14. With the intermediate frequency video and sound signals located at the points 51 and 52, respectively, on curve 50 of Fig. 4*a*, the level of this direct current component will correspond to the level at the point 57, for example. The automatic gain control circuit 22 will operate to hold the peak value of the video signal output of second detector 14 substantially constant. With the intermediate frequency sound and video signals located at points 53 and 54, respectively, on curve 50, the level of this direct current component will correspond to the level at point 58, for example. In Fig. 4*e*, line 59 represents bias voltage applied to the automatic frequency control circuit by resistor 42 to set the proper operating level. In Fig. 4*d*, curve 60 represents the response of the automatic frequency control system and curve 61 represents a suitable control characteristic for the local oscillator 12.

The operation of the automatic frequency control circuit will now be explained. When no signal is being received by the teleivsion receiver and with switch 65 being in the "local" position, a small positive bias exists on the control grid 30 of the electron discharge device 31, causing the device to conduct heavily. A large voltage drop will occur across the load resistor 42. Across the terminals of the frequency control element 24 there will be present a voltage equal to the voltage across the resistor 42. This is due to the rectification of the voltage of the local oscillator 12. Thus, the diode 47 will have zero potential across it and will not be conducting. At this time, the diode 47 is effectively an open circuit across the frequency control element 24. The local oscillator 12 is initially adjusted so that it is tuned slightly high in frequency and so it remains at this frequency. The reason the local oscillator 12 is tuned high in frequency will become clear as this description continues.

When an active television channel is selected, the received television signals are converted in the mixer 11 to intermediate frequencies. Since the frequency of the local oscillator 12 is tuned high, the intermediate frequency sound carrier at approximately 42.75 megacycles will be located at a position, such as at 53, which is high up on the response characteristic of the intermediate frequency amplifier 13 and the intermediate frequency picture carrier at 47.25 megacycles will be at a position such as at 54. The intermediate frequency picture carrier, because of its position on the response characteristic of the intermediate frequency amplifier 13 is so greatly attenuated that no beat between the intermediate frequency picure and sound carriers occurs at the second detector 14. At this time no video signals or intercarrier sound signal will be developed. However, the intermediate frequency sound carrier is located at a position high on the response characteristic. The amplitude of the intermediate frequency sound carrier will cause a substantial increase in the direct current voltage developed at the second detector 14 as shown at point 58 in Fig. 4*c*. This direct current voltage which is of negative polarity is applied through resistor 32 and causes the voltage on the control grid 30 of the electron discharge device 31 to go in a negative direction, causing the device 31 to cut off. At this time, the device 31 is acting as a direct current amplifier. With the device 31 cut off, only a small voltage drop is developed across the resistor 42. The diode 47 will now have a positive voltage applied to its plate 46 equal to the difference between the voltage appearing across the terminals of the frequency control element 24 and the voltage across the resistor 42. Since the diode 47 is now biased in the forward direction, it will conduct, causing current to flow from the negative terminal of the frequency control element 24 through the diode 47, inductor 41, resistor 42 and inductor 42 back to its positive terminal. This flow of control current lowers the effective load resistance across the terminal of the frequency control element 24 thereby lowering the frequency of the local oscillator 12.

With the frequency of the local oscillator 12 lowered, the intermediate frequency sound carrier is caused to move down the response characteristic of the intermediate frequency amplifier 13 and the intermediate frequency picture carrier is caused to move up on this response characteristic. The amplitude of the intermediate frequency sound carrier will decrease and the amplitude of the intermediate frequency picture carrier will increase. At the second detector 14, the picture carrier is detected and the 4.5 megacycle intercarrier sound signal is developed. The average direct current voltage at the second detector 14 will decrease to the level 57 as shown in Fig. 4*c*.

The change in level of the direct current voltage from detector 14 occurs when the IF sound carrier shifts from point 53 toward point 52. This voltage change is caused by the action of the peak acting AGC circuit 22 substantially as follows. The IF sound carrier is of constant amplitude, hence its average value is equal to its peak value. In contrast, the IF picture carrier, which is amplitude modulated with picture information, has a "blacker-than-black" peak having an amplitude considerably greater than its average amplitude. Specifically, on an all-black picture the average picture carrier amplitude is approximately 75% of its peak amplitude. Similarly, for a typical picture the average picture carrier amplitude is approximately one-half or 50% of the peak value. Thus, the picture carrier has a peak value to average value ratio of 2:1. The IF sound carrier has a peak value to average value ratio of 1:1. When the sound carrier is at point 53 (about 42.75 mc.), it will have a greater amplitude than the picture carrier and accordingly the AGC circuit will respond to the sound carrier to maintain a constant output from detector 14, the level of which is indicated by portion 58 of Fig. 4*c*.

Similarly, when the sound carrier is near point 52 (41.25 mc.), it will be appreciably attenuated, while the picture carrier will be within the IF passband and will be amplified. The picture carrier will have a much greater amplitude than the sound carrier and accordingly, the AGC circuit will respond to the peak values of the picture carrier to maintain those peak values at a level substantially equal to the level indicated by point 58. With the peak value of the picture carrier held at the level of point 58 and with the picture carrier having a peak to average ratio of approximately 2:1, it is clear that the average direct current voltage applied to amplifier device 31 from detector 14 will be substantially as indicated by portion 57 of Fig. 4*c*. The decrease in average direct current voltage at detector 14 from level 58 to level 57 is sufficient to unbias discharge device 31 so that it is permitted to conduct when the sound carrier and picture carrier are respectively in the vicinity of points 52 and 51 of Fig. 4*a*.

The intercarrier sound signal developed at second detector 14 is amplified in the video amplifier 15 and the electron discharge device 31 and then coupled to the diode 47 wherein it is rectified. The rectification of the intercarrier sound signal produces a flow of direct current in the frequency control element 24, the magnitude of which is a function of the amplitude of the intercarrier sound signal. The effective resistance across the frequency control element 24 is lowered, further decreasing the frequency of the local oscillator 12. Fig. 4*b* shows the intercarrier signal amplitude as a function of local oscillator frequency. Rectification of the intercarrier signal by diode 47 produces a direct current signal which varies as a function of oscillator frequency and gives substantially the same shape curve as is shown in Fig. 4*b*.

The frequency of the local oscillator 12 will continue to be decreased until the intermediate frequency picture and sound IF carriers are at the normal positions, as indicated at 51 and 52, respectively, in Fig. 4*a*. When the local oscillator 12 is at correct frequency, the control current developed by the automatic frequency control circuit is a composite function of the amplitude of the intercarrier sound signal and the average direct current voltage developed at second detector 14 and applied through resistor 32. This current represents the difference between the natural frequency and the desired frequency of the local oscillator 12. The frequency control element 24 or reactance circuit develops the necessary capacitive reactance to maintain the frequency of the local oscillator 12 at the correct value, thereby maintaining the picture and sound IF carrier signals at predetermined frequencies as indicated at points 51 and 52.

If the local oscillator 12 should drift high in frequency, the intercarrier sound signal will increase in amplitude and a greater current is developed across the frequency control element 24. This greater current lowers the frequency of the local oscillator 12. If the local oscillator 12 drifts low in frequency, the intercarrier sound signal will decrease in amplitude and a lesser current is developed across the frequency control element 24. This decrease in current increases the frequency of the local oscillator 12.

The operation of the Fig. 2 circuit with switch 65 operated to the F or fringe reception position is substantially the same as heretofore described except that: (1) with switch 65*b* operated to the F position the sound trap 70 is effectively disabled, the low frequency portion of the IF amplifier bandpass characteristic appears as shown by curve portion 52*a* in Fig. 4*a*; the intercarrier sound signal is greater in amplitude as shown by 55*a* in Fig. 4*b* and accordingly, the oscillator control voltage is greater at the low frequency end as shown by curve portion 60*a* in Fig. 4*d* and curve 84 in Fig. 4*e*, thereby causing the local oscillator to stabilize or "lock-up" at a lower frequency. The point of oscillator stabilization is determined by the intersection of curves 61 and 84 in Fig. 4*e*. (2) With switch 65*a* in the fringe operation position, the bias voltage normally applied to control element 24 by the resistor 42 is removed. Curve 82 in Fig. 4*e* indicates the control voltage at terminals 24*a*—*b* when receiving a weak or "fringe area" signal with switch 65 in the "local" position. It is to be noted that the curve 82 does not contain the level change between high and low frequencies which is indicated by the curve of Fig. 4*c*. This is because the change in direct current output voltage at detector 14 with change in frequency is very small when receiving weak signals. Accordingly, spurious lock-up could occur at the intersection of curves 82 and 61. To avoid such spurious stabilization and to achieve a wider pull-in range, for weak signal operation, the bias voltage from resistor 42 is removed from the circuit, and the frequency control operates on the curve 84 of Fig. 4*e*.

It may be seen from study of Fig. 4*e*, that shifting the switch 65 to F position causes the point of IF sound carrier stabilization to shift from point 85 to point 86. As shown in Fig. 4*a*, the picture carrier is shifted from point 51 to 51*a*, so that greater amplification of the picture carrier and picture side bands is achieved. At the same time, the sound carrier is shifted from point 52 to point 87 on curve 52*a*, and no significant change in IF sound carrier amplitude occurs.

From the foregoing, it is clear that the present invention provides an automatic frequency control system including means for increasing the receiver gain and stability when it is desired to receive weak or fringe area signals. It is well known that with a receiver in a given location, certain selectable stations (for example, channels 2 and 11) will always produce strong signals, while certain others will always produce weak signals because of distant location of the receiver from the transmitter. Accordingly, the present invention contemplates that the switch 65 may be arranged to operate in response to selection of certain predetermined "weak" channels only. To this end switch 65 is shown in Figs. 2 and 3 as being operable by means of a cam disc 64 which may be attached to the selector shaft of the conventional television tuner structure for rotation therewith. The cam disc 64 may, of course, be provided with a plurality of switch operating projections, any or all of which may be adjusted at the time of installation at a particular location, so that switch 65 will be operated to the "fringe" position only when a distant or weak channel is selected.

The above arrangement for fringe switching on predetermined weak signal channels only is particularly advantageous in television receivers having electrically controlled motor driven channel selector mechanisms. Likewise, it will be clear to those skilled in the art that the present invention greatly simplifies and enhances the effectiveness of remote control arrangements for television receivers.

While the present invention has been shown in preferred forms only, it will be obvious to those skilled in the art that it is not so limited but is susceptible of other embodiments and modifications without departing from the spirit and scope thereof.

I claim as my invention:

1. In a television receiver for receiving at least two radio frequency carriers having a substantially constant predetermined frequency difference, the combination of superheterodyne converter means to which said carriers are applied for producing a separate intermediate frequency carrier in response to each of said radio frequency carriers, means for deriving an intercarrier signal of a frequency corresponding to said predetermined frequency difference, frequency selective amplifier means coupled with said converter means and said intercarrier signal deriving means and having a frequency response characteristic such that the amplitude of said intercarrier signal varies as a function of the frequency of one of said intermediate frequency carriers, means for deriving a direct current potential having a magnitude related to the amplitude of said intercarrier signal, control means coupled to said last-mentioned means and to said converter means for controlling the frequency of said intermediate frequency carriers in response to the magnitude of said direct current potential, and means for selectively imposing a direct current control voltage component of predetermined magnitude on said control means to alter the frequencies of said intermediate frequency carriers in a manner such that the amplification of one of said intermediate frequency carriers is thereby substantially increased.

2. In a television receiver for receiving a television signal band including an amplitude modulated picture carrier and a frequency modulated sound carrier spaced a substantially fixed frequency interval from the picture carrier, the combination of superheterodyne converter means to which said carriers are applied for producing separate intermediate frequency picture and sound carriers, means for heterodyning said intermediate frequency carriers to produce an intercarrier signal of a frequency corresponding to said fixed frequency interval, frequency selective amplifier means coupled between said converter means and said intercarrier signal deriving means, said amplifier means having a frequency response characteristic such that the amplitude of said sound carrier will normally be less than the amplitude of the picture carrier at maximum modulation thereof and such that the amplitude of said sound carrier increases in response to an increase in the frequency thereof, means for deriving a direct current potential having a magnitude related to the amplitude of said sound carrier, control means coupled to said last-mentioned means and to said converter means for controlling the frequency of said intermediate frequency picture and sound carriers in response to the magnitude of said direct current potential and means for selectively imposing a direct current voltage component of predetermined magnitude on said control means so as to alter the frequencies of said intermediate frequency carriers whereby the response of said amplifier means to said picture carrier is increased.

3. In a television receiver for individually receiving a plurality of television signal bands each of which includes an amplitude modulated picture carrier and a frequency modulated sound carrier spaced a substantially fixed frequency interval from the picture carrier, the combination of: superheterodyne converter means to which said carriers are applied for producing separate intermediate frequency picture and sound carriers, in response to each of said radio frequency carriers, means for heterodyning said intermediate frequency carriers to produce an intercarrier signal of a frequency corresponding to said frequency interval, frequency selective amplifier means coupled with said converter means and said intercarrier signal deriving means, said amplifier means having a frequency response characteristic such that the amplitude of the sound carrier transmitted thereby is less than the amplitude of the picture carrier transmitted thereby at maximum modulation of the picture carrier and such that the amplitude of said sound carrier increases in response to an increase in the frequency thereof, means for deriving a direct current potential having a magnitude related to the amplitude of said intercarrier signal, variable reactance means associated with said last-mentioned means and with said converter means and operable upon the imposition of a unidirectional current component thereupon to change the frequency of said intermediate frequency carriers, tuner means for individually selecting said television signal bands, and means commonly operable with said tuner means to impose a unidirectional current component, other than that related to said intercarrier signal, in response to selection of a predetermined one of said television signal bands, said last-mentioned current component being operative to change the tuning of said receiver in a manner to substantially increase the picture carrier amplification provided by said amplifier means.

4. In a television receiver for individually receiving a plurality of television signal bands each of which includes an amplitude modulated picture carrier and a frequency modulated sound carrier spaced a substantially fixed frequency interval from the picture carrier, the combination of: superheterodyne converter means to which said carriers are applied for producing separate intermediate frequency picture and sound carriers in response to each of said radio frequency carriers, means for deriving an intercarrier signal of a frequency corresponding to said predetermined frequency, frequency selective amplifier means coupled with said converter means and said intercarrier signal deriving means and having a frequency response characteristic such that the amplitude of said intercarrier signal varies as a function of the frequency of said intermediate frequency sound carrier, means for deriving a direct current potential having a magnitude related to the amplitude of said intercarrier signal, variable reactance means coupled to said last-mentioned means and to said converter means for controlling the frequency of said intermediate frequency carriers in response to the magnitude of said direct current potential, and means for selectively imposing a unidirectional current component of predetermined magnitude on said control means to alter the frequencies of said intermediate frequency carriers in a manner to increase the picture carrier amplification provided by said amplifier means, tuner means for individually selecting said television signal bands with said unidirectional current imposing means and said tuner means being commonly operable so that said unidirectional current component is imposed when a predetermined one of said television signal bands is selected.

5. A receiver comprising in combination a source adapted to supply at least two carrier frequencies, a first detector to which said carrier frequencies are supplied, a local oscillator, the output of said local oscillator being coupled to said first detector so as to produce at least two intermediate frequency carriers, an intermediate frequency amplifier connected to the output of said first detector, said intermediate frequency amplifier being adapted to pass at least some energy of two of the intermediate frequency carriers supplied by said first detector, a second detector coupled to the output of said intermediate frequency amplifier for producing an intercarrier beat frequency signal, means coupled to said second detector for deriving a direct current control potential having a magnitude related to the amplitude of said intercarrier beat signal, variable reactance means to which said control potential is supplied coupled to said local oscillator for controlling the frequency thereof in response to said control potential, a source of bias potential, and means for selectively supplying said bias potential to said reactance means in additive relation with said control potential, said bias potential being operative to decrease the frequency at which said local oscillator is stabilized to thereby decrease the frequencies of said intermediate frequency carriers.

6. In a television receiver including channel selector means for individually receiving a plurality of television signals each of which includes two carriers having a predetermined frequency difference, the combination of a superheterodyne detector including oscillator means for producing a separate intermediate frequency carrier in response to each of said two carriers, means for deriving an intercarrier signal of a frequency substantially equal to said predetermined frequency difference, means coupled with said intercarrier signal deriving means for controlling the frequency of said oscillator means in response to the amplitude of said intercarrier signal, and biasing means for selectively imposing a unidirectional current component upon said oscillator controlling means to selectively decrease the frequencies of said intermediate frequency carriers a predetermined amount whereby the tuning of said receiver is changed in a manner to substantially increase the amplitude of one of said intermediate frequency carriers, said biasing means being commonly operable with said channel selector means and being so constructed and arranged that said unidirectional current component is imposed coincidentally with selection of predetermined television signal channels.

References Cited in the file of this patent

UNITED STATES PATENTS

| | | |
|---|---|---|
| 2,099,156 | Wheeler | Nov. 16, 1937 |
| 2,664.464 | Cotsworth | Dec. 29, 1953 |